United States Patent
Sedlak et al.

(10) Patent No.: US 6,492,626 B1
(45) Date of Patent: Dec. 10, 2002

(54) METHOD AND SYSTEM FOR REGULATING A TEMPERATURE OF COUPLING FORMATIONS

(75) Inventors: John Michael Sedlak, Shreveport, LA (US); David Michael Prough, Leo, IN (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 09/686,388

(22) Filed: Oct. 9, 2000

(51) Int. Cl.[7] .................................................. H05B 1/02
(52) U.S. Cl. ........................ 219/497; 219/505; 219/535; 219/85.1
(58) Field of Search ........................ 219/121.45, 121.46, 219/497, 535, 85.1, 137 WM, 494

(56) References Cited

U.S. PATENT DOCUMENTS

| | | | |
|---|---|---|---|
| 4,529,115 A | * | 7/1985 | Renshaw et al. ............ 228/1.1 |
| 4,698,774 A | * | 10/1987 | Abe et al. .................... 364/477 |
| 5,733,041 A | | 3/1998 | Sedlak et al. |
| 5,917,608 A | | 6/1999 | Naya et al. |
| 6,124,568 A | * | 9/2000 | Broderick et al. .. 219/137 WM |
| 6,184,504 B1 | | 2/2001 | Cardella |
| 6,195,581 B1 | | 2/2001 | Beerwerth et al. |
| 6,273,022 B1 | | 8/2001 | Pu et al. |
| 6,280,584 B1 | | 8/2001 | Kumar et al. |
| 6,284,997 B1 | * | 9/2001 | Zehavi et al. .......... 219/121.46 |
| 6,291,807 B2 | * | 9/2001 | Wiezbowski ................ 219/667 |

* cited by examiner

Primary Examiner—Mark Paschall
(74) Attorney, Agent, or Firm—Karl A. Vick, Esq.; Armstrong Teasdale LLP

(57) ABSTRACT

A method for regulating a coupling formation includes sensing a temperature of a coupling with a non-contact sensor and sending the temperature to a control unit that regulates the temperature of the coupling formation. In addition, a system for regulating a temperature of a coupling formation includes a temperature control unit and a non-contact sensor in flow communication with the temperature control unit.

21 Claims, 2 Drawing Sheets

METHOD AND SYSTEM FOR REGULATING A TEMPERATURE OF COUPLING FORMATIONS

BACKGROUND OF THE INVENTION

This invention relates generally to couplings and, more particularly, to coupling formations.

During soldering, welding, brazing and other coupling applications heat is typically applied to melt metal or plastic for coupling. To couple two components, the components are positioned such that there is at least one contact location between the components and molten material is then applied to the contact location. After an elapsed time period, the molten material cools to solidify and couple the components together. Alternatively, a molten material is applied to a first component and then a second component is placed in contact with the molten material. After the molten material cools, the components are then coupled.

The structural integrity and strength of the coupling may be dependent upon a temperature of the molten material applied to the components. If the temperature of the molten material is too high the molten material may flow too freely and form a thin bond. Conversely, if the temperature is too low, the molten material may not melt sufficiently and may not bond effectively between the components.

To ensure successful coupling formation, visual inspections are performed during the coupling of the components. Such visual inspections reveal only visibly poor couplings and do not reveal temperature fluctuations that may be indicative of a heat coupling process drift. As a result, additional inspections are done after the coupling is formed and include various non-destructive inspections and destructive inspections. Typically, the non-destructive inspections include ultrasound inspections and x-ray inspections, and the destructive inspections include stress tests and pressure tests. However, such inspections are costly and are only reliable after the component coupling is completed.

Moreover, since visual inspections and post-formation inspections are only effective after a poor coupling is completed, process drift is not corrected until the drift is such that poor couplings are completed.

BRIEF SUMMARY OF THE INVENTION

A method for regulating a coupling formation includes sensing a temperature of a coupling with a non-contact sensor and sending the temperature to a control unit that regulates the temperature of the coupling formation. In addition, a system for regulating a temperature of a coupling formation includes a temperature control unit and a non-contact sensor in flow communication with the temperature control unit.

DETAILED DESCRIPTION OF THE INVENTION

Figure 1:
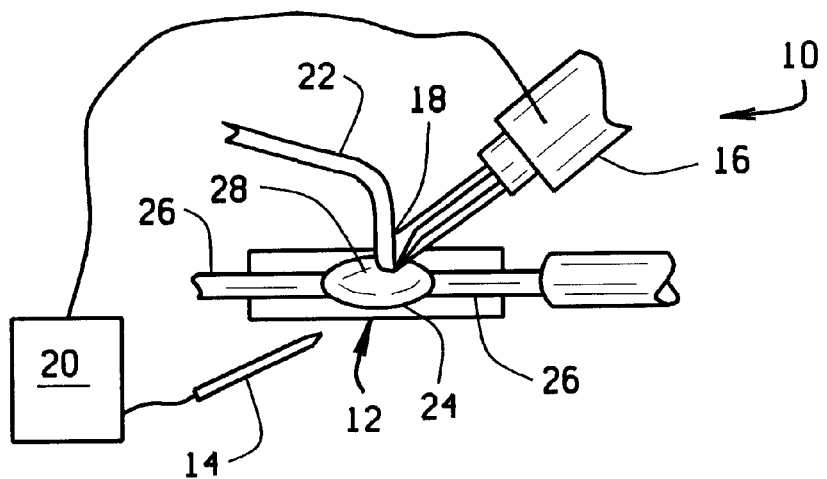
FIG. 1 is a perspective view of an embodiment of a heat coupling control system.

FIG. 1 is a perspective view of an exemplary embodiment of a control system 10 used to monitor a temperature of a coupling formation 12. Control system 10 includes a sensor 14 and a soldering gun 16 including a tip 18. In one embodiment, sensor 14 is an infrared sensor. A control circuit 20 is electronically coupled to control system 10 and accepts an output of sensor 14 and controls a temperature of tip 18. Control system 10 further includes solder 22, molten solder pool 24, and a plurality of components 26. Molten solder pool includes a surface 28.

During operation, infrared sensor 14 monitors coupling 12 being formed by soldering gun 16 and solder 22. Control circuit 20 controls an amount of electrical current supplied to tip 18 to regulate a temperature of solder pool 24 within a pre-defined range. Regulating a temperature of solder pool 24 enables components 26 to be coupled. In an exemplary embodiment, sensor 14 is an OS20 Infrared Pyrometer available from Omega Engineering, Inc. In an alternative embodiment, control system utilizes other types of non-contact temperature sensors.

A position of sensor 14 relative to surface 28 of pool 24 is selected to enable measurement of either the entire pool 24 or a particular portion of pool 24. Alternatively, sensor 14 is positionable such that the temperature of tip 18 may be monitored if desired. In an alternative embodiment, control system 10 controls various temperature sensitive coupling methods other than soldering, including, but not limited to, welding, brazing, cryogenic coupling, hot wedge, hot air, hot air seam sealing and ultrasound applications.

Figure 2:
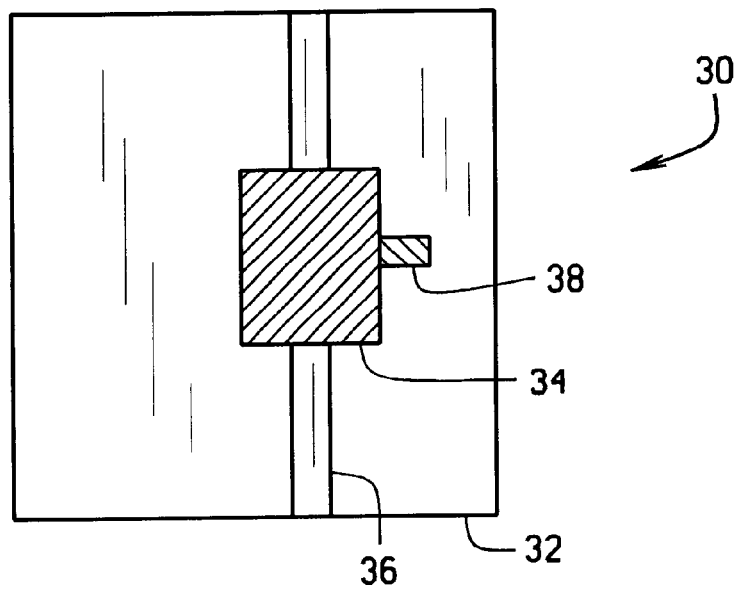
FIG. 2 is a plan view of a table mounted heat coupling control system.
Figure 3:
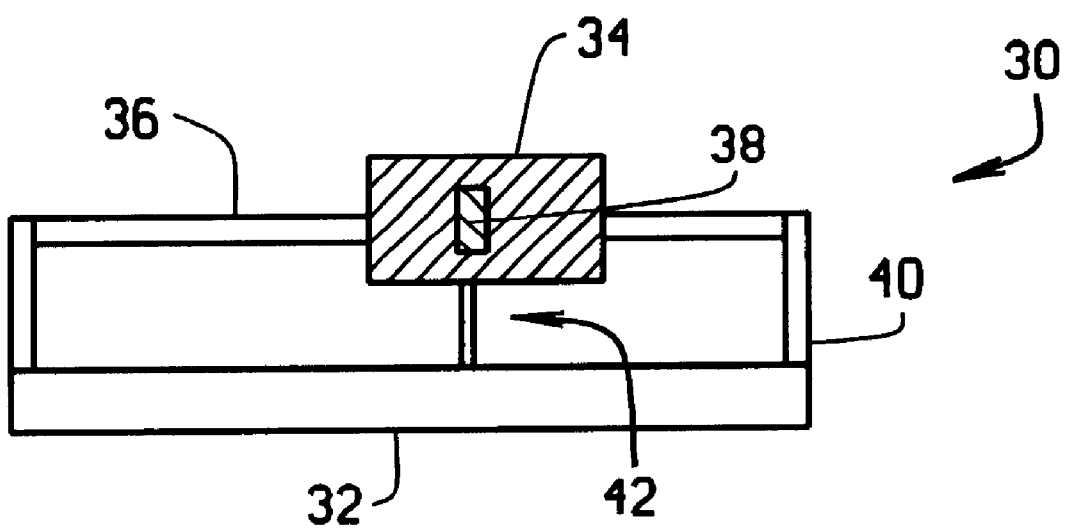
FIG. 3 is a side view of the table mounted heat coupling system shown in FIG. 2.

FIG. 2 is a plan view and FIG. 3 is a side view of a table mounted control system 30 including a table 32 and a heat coupling device 34 that is slidably coupled to a guide rod 36. Heat coupling device includes an infrared sensor 38. Guide rod 36 is mounted to table 32 with a plurality of support arms 40. A welding finger 42 is coupled to heat coupling device 34.

During operation, after at least two components (not shown) to be welded are placed on table 32 such that a desired coupling area is under a path of welding finger 42, heat coupling device 34 traverses guide rod 36 and sensor 38 provides a temperature feedback to heat coupling device 34, thus permitting a continuous temperature monitoring of a welding operation.

In an exemplary embodiment, welding finger 42 includes at least one orifice (not shown) to dispense a molten material appropriate for welding metal components together, such as, for example, a molten metal. In operation, at least two metal components (not shown) are placed such that a desired coupling area (not shown) is under a path (not shown) of welding finger 42. Typically, the metal components include edges positioned approximately abutting under the path of welding finger 42. As heat coupling device 34 traverses guide rod 36, welding finger 42 dispenses molten material while sensor 38 senses a temperature of the molten material and the temperature is regulated to he within a pre-defined temperature range. The molten material is dispensed through the orifice and, after an elapsed time period, the molten material cools and solidifies, thus coupling the components.

In an alternative exemplary embodiment, the welding finger includes at least one orifice (not shown) to dispense a molten material appropriate for welding plastic components together, such as, for example, a molten plastic. In operation, at least two plastic components (not shown) are placed such that a desired coupling area (not shown) is under a path (not shown) of the welding finger. Typically, the plastic components include edges that are positioned approximately abutting under the path of the welding finger. As the heat coupling device traverses the guide rod, the welding finger dispenses molten material while a sensor senses a temperature of the molten material and the temperature is regulated to be within a pre-defined temperature range. The molten material is dispensed through the orifice and, after an elapsed time period, the molten material cools and solidifies, thus coupling the components.

In a further alternative exemplary embodiment, a welding finger includes a transducer (not shown) appropriate for welding plastic components (not shown) together. In operation, at least two plastic components are placed such that a desired coupling area is under a path of the welding finger. Typically, the plastic components include edges that are overlapped under the path of the welding finger. As a heat coupling device traverses a guide rod, the transducer of the welding finger emits ultrasonic sound waves that heat the plastic under the path of the welding finger. A sensor senses the temperature of the plastic. In applications with heat the control device having a velocity along the guide rod, a coupling time is regulated by regulating the velocity. Transducer parameters and/or the coupling time are regulated such that the temperature of the plastic under the welding finger is within a pre-defined temperature range. Transducer parameters include frequency of sound waves and amplitude of sound waves. Accordingly, the plastic components are coupled with a seam weld.

In a further alternative exemplary embodiment, a welding finger includes a conductor (not shown) appropriate for resistively welding metallurgical components together. In operation, at least two metallurgical components (not shown) are placed such that a desired coupling area is under a path of the welding finger. The path includes a metal plate (not shown) to complete an electrical circuit (not shown) including the metal plate, the welding finger, and the metallurgical components to be welded. Typically, the metallurgical components include edges that are overlapped under the path of the welding finger. As a heat coupling device traverses a guide rod, the welding finger supplies an amount of electrical current that passes through the metallurgical components to the metal plate. A resistive heating occurs in the metallurgical components and a sensor senses the temperature of the components and the amount of electrical current is regulated such that the temperature of the metal under welding finger is within a pre-defined range.

In an alternative exemplary embodiment, a velocity of a heat coupling device traversing a guide rod is regulated such that the temperature of the metal under a welding finger is within a pre-defined temperature. In a further alternative exemplary embodiment, a heat coupling device is stationary and a coupling time is controlled. An amount of electrical current passes through the components until a sensor senses that the temperature of the metal under a welding finger is within a pre-defined range and the current is stopped.

While the invention has been described in terms of various specific embodiments, those skilled in the art will recognize that the invention can be practiced with modification within the spirit and scope of the claims.

What is claimed is:

1. A method for regulating a temperature of a coupling formation, said method comprising the steps of:
   sensing a temperature of a coupling formation with a non-contact sensor; and
   transmitting the temperature to a control unit that regulates the temperature of the coupling formation.

2. A method in accordance with claim 1 further comprising the step of regulating the temperature of the coupling formation such that the temperature is within a pre-defined temperature range.

3. A method in accordance with claim 1 wherein said step of sensing a temperature further comprises the step of sensing a temperature of a coupling with an infrared sensor.

4. A method in accordance with claim 1 further comprising the step of heating a material with at least one of ultrasonic sound waves, electrical current, and heat.

5. A method in accordance with claim 4 wherein said step of heating a material further comprises the step of using a welding finger to heat a material.

6. A method in accordance with claim 2 wherein said step of regulating the temperature further comprises the step of regulating the temperature of the coupling formation by regulating at least one of an electrical current, a frequency of sound waves, an amplitude of sound waves, and a coupling time.

7. A method in accordance with claim 1 wherein said step of sensing a temperature further comprises the step of sensing a temperature of at least one of a metallurgical coupling formation and a plastic coupling formation.

8. A method in accordance with claim 1 wherein said step of sensing further comprises the step of sensing a temperature of a coupling formation using at least one of soldering, welding, and brazing.

9. A method according to claim 1 wherein the coupling formation fabricated by at least one of soldering, welding, and brazing, said step of sensing a temperature further comprises the step of sensing a temperature of at least one of a metallurgical coupling formation and a plastic coupling formation.

10. A method according to claim 1 wherein the coupling formation fabricated by at least one of soldering, welding, and brazing, said step of sensing further comprises the step of using an infrared sensor to sense a temperature of at least one of a metallurgical coupling formation and a plastic coupling formation.

11. A method in accordance with claim 1 wherein said sensing a temperature of a coupling formation with a non-contact sensor comprises sensing a temperature of a coupling formation with a non-contact sensor that is slidably coupled to a guide rod such that the non-contact sensor traverses the guide rod.

12. A system for regulating a temperature of a coupling formation, said system comprising:
   a temperature control unit; and
   a non-contact sensor in flow communication with said temperature control unit, said temperature control unit configured to regulate a temperature of said coupling formation within a pre-defined temperature range.

13. A system in accordance with claim 11 wherein said non-contact sensor comprises an infrared sensor.

14. A system in accordance with claim 11 further comprising an apparatus configured to emit at least one of ultrasonic sound waves, electrical current, and heat.

15. A system in accordance with claim 14 wherein said apparatus comprises a welding finger.

16. A system in accordance with claim 11 wherein said temperature control unit configured to regulate a temperature of the coupling formation by regulating at least one of an electrical current, a frequency of sound waves, an amplitude of sound waves, and a coupling time.

17. A system in accordance with claim 11 wherein said non-contact sensor electrically connected to said temperature control unit.

18. A system in accordance with claim 11 wherein said non-contact sensor optically connected to said temperature control unit.

19. A system in accordance with claim 11 wherein the coupling formation fabricated by at least one of soldering, welding, and brazing, said non-contact sensor configured to sense a temperature of at least one of a metallurgical coupling and a plastic coupling.

20. A system in accordance with claim 11 wherein the coupling formation fabricated by at least one of soldering, welding, and brazing, said temperature control unit configured to adjust a temperature of said coupling by regulating at least one of an electrical current, a frequency of sound waves, an amplitude of sound waves, and a coupling time, said non-contact sensor configured to sense with an infrared sensor a temperature of at least one of a metallurgical coupling and a plastic coupling.

21. A system in accordance with claim 12 further comprising a guide rod, wherein said non-contact sensor is slidably coupled to said guide rod such that said non-contact sensor traverses said guide rod.

\* \* \* \* \*

UNITED STATES PATENT AND TRADEMARK OFFICE
CERTIFICATE OF CORRECTION

PATENT NO.    : 6,492,626 B1  
DATED         : December 10, 2002  
INVENTOR(S)   : Sedlak et al.

It is certified that error appears in the above-identified patent and that said Letters Patent is hereby corrected as shown below:

Column 4,
Lines 48, 50, 55, 60, 63 and 66, delete "11" and insert therefor -- 12 --.

Column 5,
Line 4, delete "11" and insert therefor -- 12 --.

Signed and Sealed this

Fifth Day of April, 2005

JON W. DUDAS
*Director of the United States Patent and Trademark Office*